(12) United States Patent
Shi et al.

(10) Patent No.: US 9,309,908 B2
(45) Date of Patent: Apr. 12, 2016

(54) COMMUNICATION MODULE LATCHING MECHANISM

(71) Applicant: FINISAR CORPORATION, Sunnyvale, CA (US)

(72) Inventors: Shamei Shi, Shanghai (CN); William H. Wang, Pleasanton, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 580 days.

(21) Appl. No.: 13/671,873

(22) Filed: Nov. 8, 2012

(65) Prior Publication Data

US 2014/0126957 A1    May 8, 2014

(51) Int. Cl.
| | |
|---|---|
| *G02B 6/36* | (2006.01) |
| *F16B 5/12* | (2006.01) |
| *F16B 7/04* | (2006.01) |
| *G02B 6/42* | (2006.01) |

(52) U.S. Cl.
CPC ................. *F16B 5/125* (2013.01); *F16B 7/042* (2013.01); *G02B 6/4246* (2013.01); *G02B 6/4261* (2013.01); *Y10T 403/591* (2015.01)

(58) Field of Classification Search
CPC .. G02B 6/4246; G02B 6/4261; G02B 6/4284; G02B 6/4278; H01R 13/1335; H01R 13/6273
See application file for complete search history.

(56) References Cited

U.S. PATENT DOCUMENTS

| | | | |
|---|---|---|---|
| 2008/0247762 A1 | 10/2008 | Yoshikawa et al. | |
| 2011/0080008 A1* | 4/2011 | Teo ..................... | H01R 13/6272 292/197 |
| 2012/0148198 A1 | 6/2012 | Togami et al. | |

FOREIGN PATENT DOCUMENTS

| | | |
|---|---|---|
| JP | 2004-354866 | 12/2004 |
| KR | 10-2006-0039809 A | 5/2006 |

OTHER PUBLICATIONS

International Search Report and Written Opinion mailed Feb. 26, 2014 in related PCT Application No. PCT/US2013/069315.

* cited by examiner

*Primary Examiner* — Michelle R Connelly
*Assistant Examiner* — Hoang Tran
(74) *Attorney, Agent, or Firm* — Maschoff Brennan

(57) ABSTRACT

An example embodiment includes a latching mechanism configured to selectively secure a communication module to a receptacle of a host device. The latching mechanism includes a latch, a cam, and a latch release. The latch includes a latch hook and a latch protrusion. The cam is mechanically coupled to the latch release. The cam is positioned with respect to the latch such that an activation force applied to the latch release translates the cam to contact the latch protrusion and displace the latch hook.

16 Claims, 13 Drawing Sheets

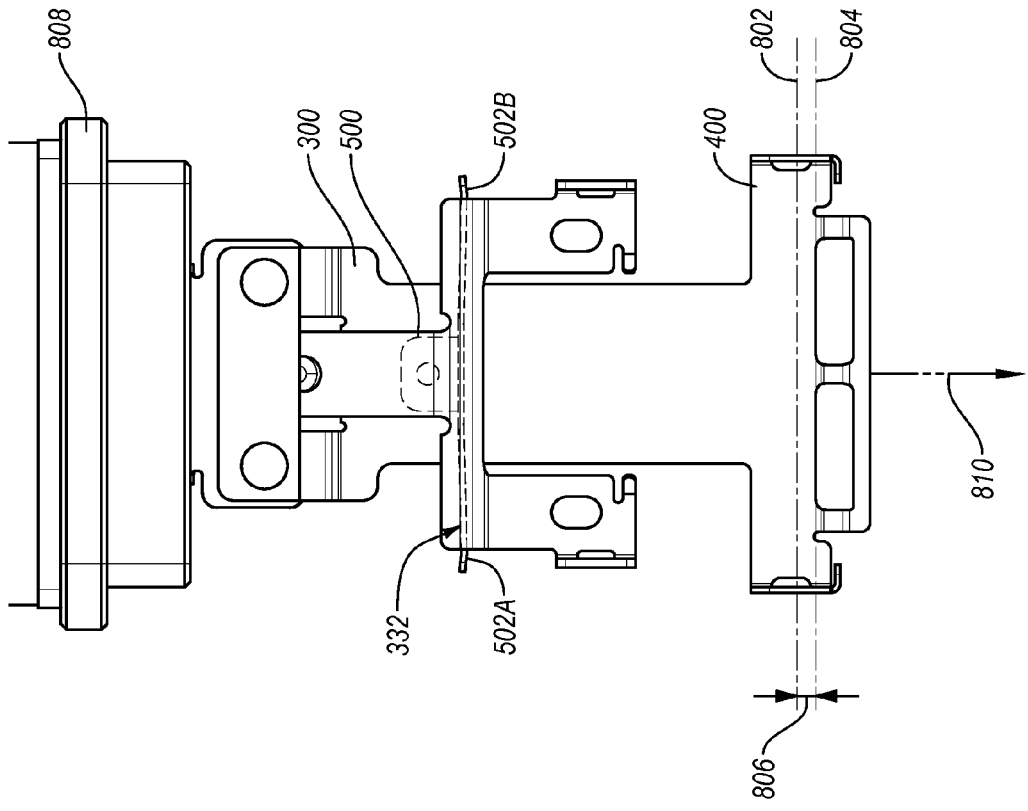
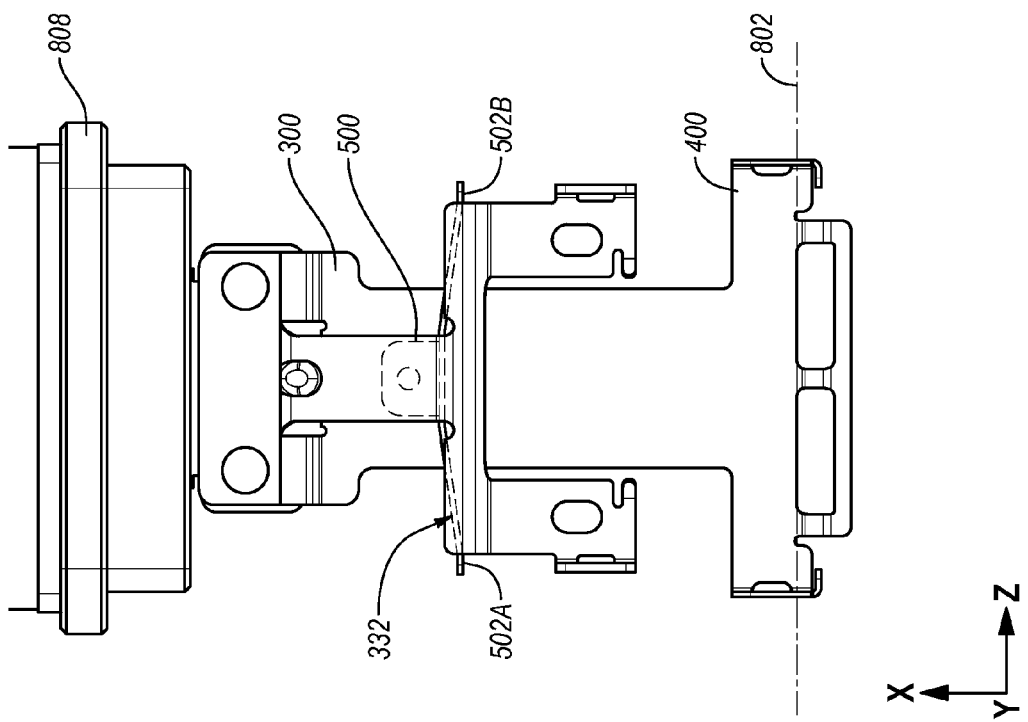
Fig. 8A
Fig. 8B

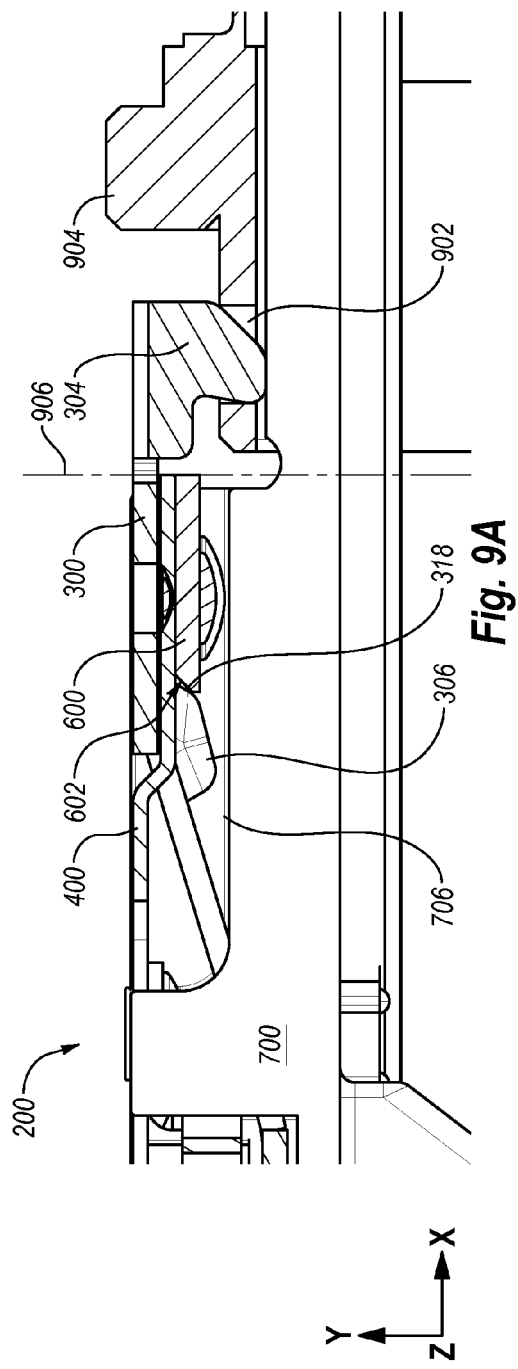
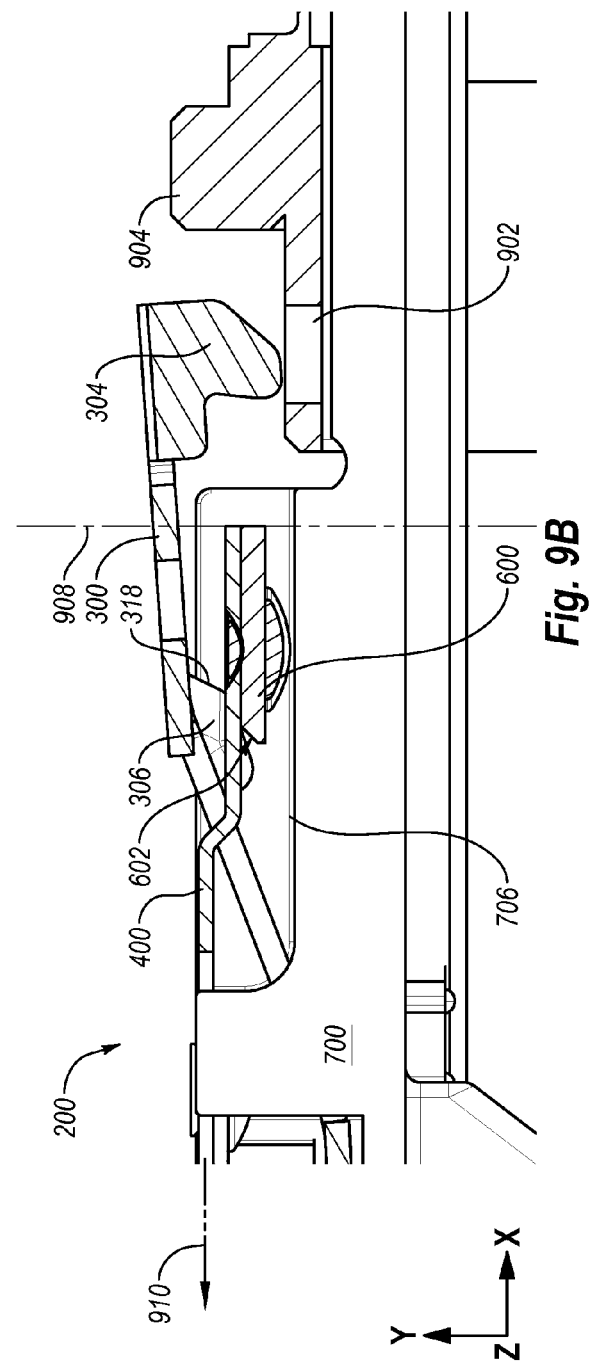
Fig. 9A
Fig. 9B

COMMUNICATION MODULE LATCHING MECHANISM

BACKGROUND

1. Field

Embodiments disclosed herein relate generally to communication modules. More particularly, some example embodiments relate to a latching mechanism for use in selectively securing a communication module within a receptacle of a host device.

2. Related Technology

Communication modules (module), such as electronic or optoelectronic transceiver or transponder modules, are increasingly used in electronic and optoelectronic communication. Some modules are pluggable, which permits the module to be inserted into and removed from a receptacle of a host device, such as a host computer, switching hub, network router, or switch box. Some host devices include multiple receptacles and can, therefore, accommodate multiple modules simultaneously. Each module typically communicates with a printed circuit board of the host device by transmitting and/or receiving electrical data signals to and/or from the printed circuit board of the host device. These electrical data signals can also be transmitted by the module outside the host device as optical and/or electrical data signals.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

Some embodiments described herein relate to a latching mechanism for selectively securing a communication module within a receptacle of a host device.

One example embodiment includes a latching mechanism configured to selectively secure a communication module to a receptacle of a host device. The latching mechanism includes a latch, a cam, and a latch release. The latch includes a latch hook and a latch protrusion. The cam is mechanically coupled to the latch release. The cam is positioned with respect to the latch such that an activation force applied to the latch release translates the cam to contact the latch protrusion and displace the latch hook.

Another example embodiment includes a communication module. The communication module includes a shell and a latching mechanism. The shell defines a cavity within which at least one transmitter and at least one receiver are positioned for transmitting and receiving data signals. The shell also includes a top shell defining a first cavity and a second cavity. The latching mechanism is secured to the shell and at least partially positioned within the first cavity and the second cavity and is configured to selectively secure the module within a receptacle of a host device. The latching mechanism includes a latch, a latch release, and a cam.

The latch includes a first portion including a latch hook. The latch hook is positioned outside of the first cavity. The latch also includes a second portion positioned in the first cavity, a third portion secured in the second cavity, and a latch neck connecting the third portion to the second portion. The second portion and the first portion are free to be displaced in a direction substantially normal to the shell. The latch release is configured to translate independent of the latch and the top shell when an activation force is applied to the latch release. The latch release includes a latch release member neck. The latch neck is positioned between the latch release member neck and the top shell. The latch release also includes a coupling flap positioned between the second portion and a cam. The cam is mechanically coupled to the coupling flap. The cam is positioned between the coupling flap and the top shell such that the activation force applied to the latch release translates the cam to contact and displace the first portion.

Another example embodiment includes a latching mechanism configured to selectively secure a communication module to a receptacle of a host device. The latching mechanism includes a latch, a cam, a latch release, a return spring, and a top shell. The latch includes a latch hook, a latch protrusion, and a ramped surface. The cam is mechanically coupled to the latch release. The return spring is positioned between the latch and the latch release and configured to contact the ramped surface. The top shell of the communication module defines a plurality of cavities in which the cam, the latch release, the latch, and the return spring are configured to be at least partially positioned. The latching mechanism is configured such that when an activation force is applied to the latch release, the latch release and the cam translate independent of the latch and the top shell such that the cam contacts the latch protrusion, displacing the latch hook and the return spring is compressed against the ramped surface generating a return force.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages of the invention will be set forth in the description, which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description will be rendered by reference to specific embodiments thereof, which are illustrated in the appended drawings. It is appreciated that these drawings depict only typical embodiments of the invention and are, therefore, not to be considered limiting of its scope. The invention will be described and explained with additional specificity and detail through the use of the accompanying drawings in which:

FIGS. 8A and 8B illustrate an example operation of the return spring of FIG. 5; and FIGS. 9A and 9B illustrate an example operation of the latching mechanism of FIGS. 2A-2C.

DETAILED DESCRIPTION OF SOME EXAMPLE EMBODIMENTS

Example embodiments relate to a latching mechanism for use in selectively securing a communication module (module) within a receptacle of a host device. One example embodiment includes a latching mechanism. The latching mechanism is secured, at least partially, to a shell of a module. The latching mechanism includes a latch, a latch release member, and a cam. The latch includes latch hooks configured to engage a structure of a host device. The latch includes a latch protrusion configured to contact the cam when the latch release member is translated in response to application of an activation force. The cam contacts the latch protrusion transferring the activation force to the latch, flexing the latch and rotating a first portion of the latch such that latch hooks disengage from the structure of the host device. In some embodiments, the latching mechanism allows the module to be secured into a receptacle of the host device by simply pushing the module into the receptacle. In these and other embodiments, the latch may be biased such that the latch hooks engage a corresponding receiver on the receptacle. Additionally, in these and other embodiments, the latch release may be mechanically coupled to a pull-tab. A user may simply pull on the pull-tab, which causes the translation necessary to disengage the module from the receptacle. Some additional embodiments are described herein referring to the appended figures.

I. An Example Communication Module

Figure 1A:
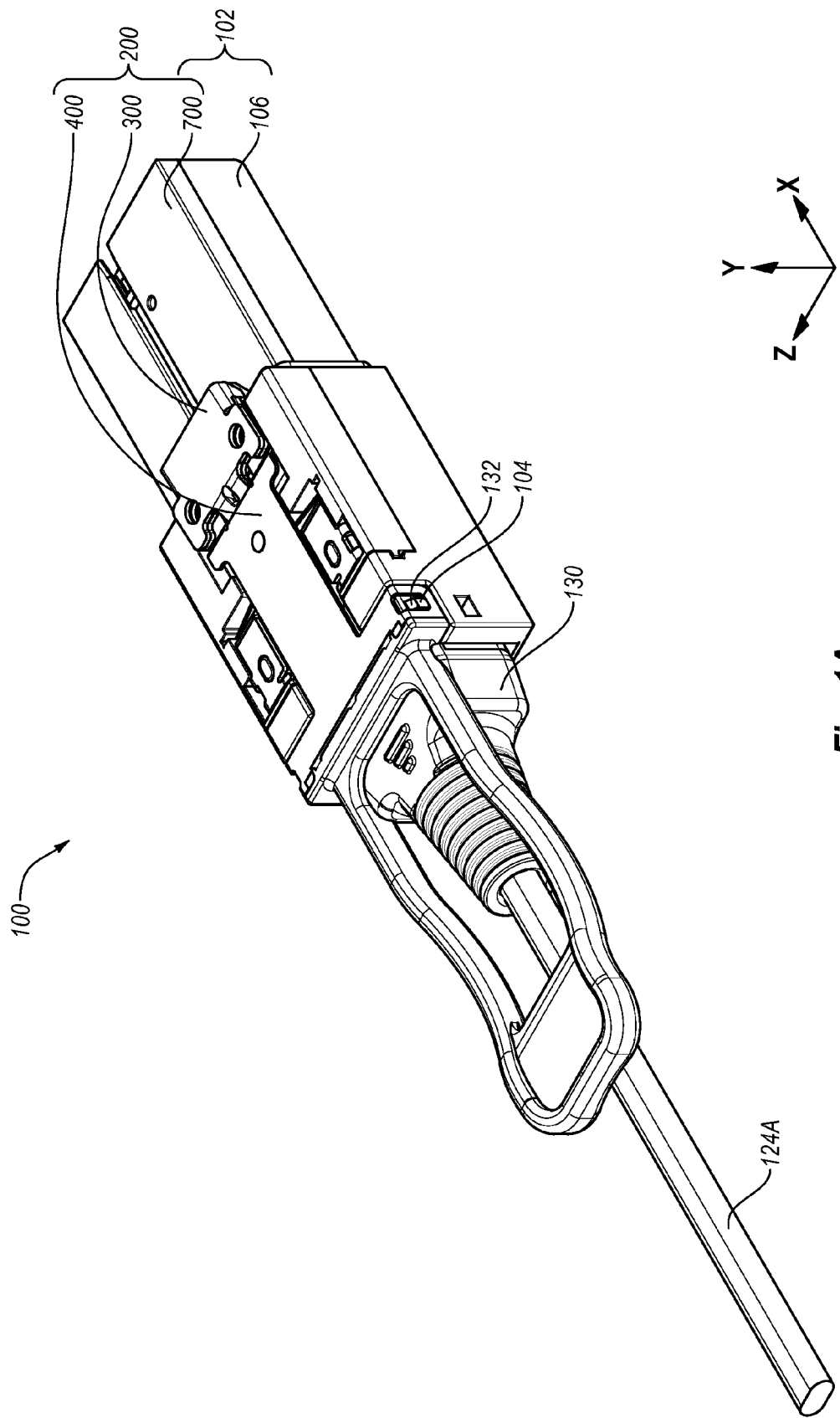
FIGS. 1A and 1B illustrate an example communication module.
Figure 1B:
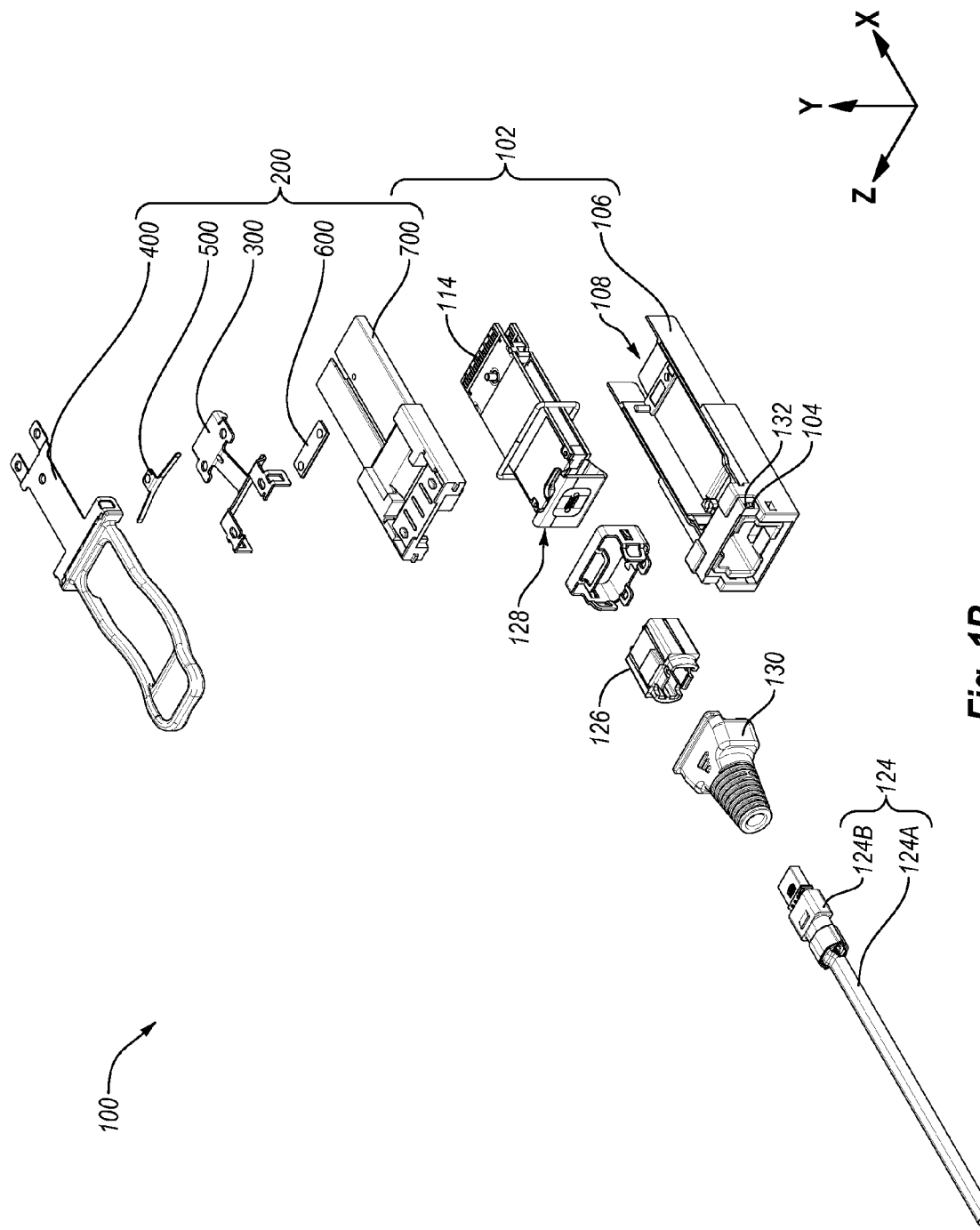

FIGS. 1A and 1B illustrate an example communication module (module) 100. Generally, the module 100 may be used in transmitting and receiving optical signals in connection with a host device (not shown). The host device may be operatively connected in a communication network (not shown). FIG. 1A depicts a perspective view of the module 100 and FIG. 1B depicts a partially-exploded perspective view of the module 100.

The module 100 depicted in FIGS. 1A and 1B conforms to a CXP form factor as defined by the Infiniband Trade Association. However, this depiction is not meant to be limiting. The module 100 may generally refer to electrical modules or optoelectronic modules, which include both optical and electrical components. Some example optoelectronic modules may include, but are not limited to, active electrical cables, active optical cables, transponders, transceivers, transmitters, and/or receivers.

In embodiments in which the module 100 includes an optoelectronic module, the module 100 may be implemented in the communication network. The communication network may include, but is not limited to, local area networks, metro area networks, storage area networks, wide area networks, and the like. The module 100 may be configured to conform to one or more standardized form factors or multi-source agreements ("MSAs"), including the CXP, CFP, XFP, and SFP+ form factors, without restriction. Alternatively, in some embodiments, the module 100 may not comply with standardized form factor requirements and may have any size and/or configuration according to a particular design.

The module 100 may be configured for electrical and/or optical signal transmission and reception at a variety of per-second data rates. Some example common signaling rates of the modules 100 described herein include, but are not limited to, 10 Gigabits per second ("G"), 40 G, 100 G, or higher.

Furthermore, the module 100 may be configured for optical signal transmission and reception at multiple wavelengths. Some example signal transmission and reception wavelengths include, but are not limited to, 850 nanometers (nm), 1310 nm, 1470 nm, 1490 nm, 1510 nm, 1530 nm, 1550 nm, 1570 nm, 1590 nm, or 1610 nm. Additionally, the module 100 may be configured to support multiple transmission standards. Some example transmission standards include, but are not limited to, 10 Gigabit Ethernet, 100 Gigabit Ethernet, 1x, 2x, 4x, 10x, and 16x Fibre Channel, and 1x, 4x, and 12x SDR, DDR, and QDR Infiniband.

A more particular description of the module 100 as depicted in FIGS. 1A and 1B follows. As illustrated in FIGS. 1A and 1B, the module 100 includes a shell 102 made up of a top shell 700 and a bottom shell 106. Although the shell 102 is illustrated as being made up of two components (i.e., top shell 700 and bottom shell 106), the shell 102 can alternately be made up of a unitary component or three or more components.

The bottom shell 106 includes one or more limiting protrusions 104 that include a sloped surface 132. In FIGS. 1A and 1B, only one limiting protrusion 104 with one sloped surface 132 is visible. However, in this and other embodiments, another limiting protrusion 104 with another sloped surface 132 may be included on the other side of the module 100 substantially similar to the labeled limiting protrusion 104.

The limiting protrusions 104 extend from the bottom shell 106 and may at least partially secure a latch release 400 to the module 100. Additionally, the limiting protrusions 104 may limit relative translation of the latch release 400 with respect to the shell 102. Some additional details of the limiting protrusions 104 are provided below.

As best seen in FIG. 1B, the shell 102 defines a cavity, generally indicated at 108, within which are positioned optoelectronic components 128 including at least one optical transmitter and at least one optical receiver. In this and some other embodiments, the optical transmitter includes a 12×1 array of vertical cavity surface emitting lasers ("VCSEL") and the optical receiver includes a 12×1 array of p-type, intrinsic, n-type ("PIN") photodiodes. Alternately, the optoelectronic components 128 may include other types of optical transmitters, such as edge-emitting lasers, in the same or different quantities or configurations and/or other types of optical receivers in the same or different quantities or configurations. In other embodiments, the module 100 may implement electrical transmitters and receivers, rather than the optical transmitter and the optical receiver.

A printed circuit board assembly ("PCBA") 114 is at least partially positioned in the cavity 108. The PCBA 114 may include edge connectors, a laser driver, and a post amplifier, for instance. The edge connectors interface with a host device to communicate electrical data signals between the host device and the module 100. Electrical data signals received from the host device are provided to the laser driver, which drives the optical transmitter to emit optical data signals representative of the received electrical data signals. Alternately or additionally, optical data signals can be received by the optical receiver, which converts the received optical data signals to electrical data signals and provides the electrical data signals to the post amplifier for amplification prior to being communicated to the host device via one or both of the edge connectors.

A cable assembly 124 is provided that includes a plurality of optical fibers (not shown) positioned within cable cladding 124A (FIGS. 1A and 1B) and a fiber optic connector 124B. The fiber optic connector 124B may be generally surrounded by a boot 130. In other examples, the cable assembly 124 includes a plurality of electrical wires and an electrical connector, rather than optical fibers and the fiber optic connector 124B. Alternately, the cable assembly 124 may be omitted altogether in some configurations.

The optical fibers of cable assembly 124 may include, for example, 12 transmit multimode parallel ribbon fibers and 12 receive multimode parallel ribbon fibers, or a total of 24 multimode parallel ribbon fibers. In other examples, the optical fibers are multimode fibers or single mode fibers having any number of transmit fibers and any number of receive fibers implemented in a parallel ribbon or as individual fibers.

The fiber optic connector 124B is received within alignment guide 126, which may partially position the optical fibers of the cable assembly 124 within the module 100. The fiber optic connector 124B may, at least partially, align the optical fibers of the cable assembly 124 with the optical transmitter and the optical receiver of the optoelectronic components 128. By aligning the optical fibers of the cable assembly 124 with the optoelectronic components 128 optical signals may be emitted onto and/or received from the optical fiber(s) of cable assembly 124.

The module 100 further includes a latching mechanism 200 (best illustrated in FIG. 1B). The latching mechanism 200 may include a latch 300, the latch release 400, a return spring 500, a cam 600, and the top shell 700 (note, the top shell 700 is part of the shell 102 and the latching mechanism 200). Briefly, the latching mechanism 200 may be at least partially secured to the shell 102 and may be configured to selectively secure the module 100 within a receptacle of a host device. Some additional details regarding the latching mechanism 200 are provided below.

II. An Example Latching Mechanism

Figure 2A:
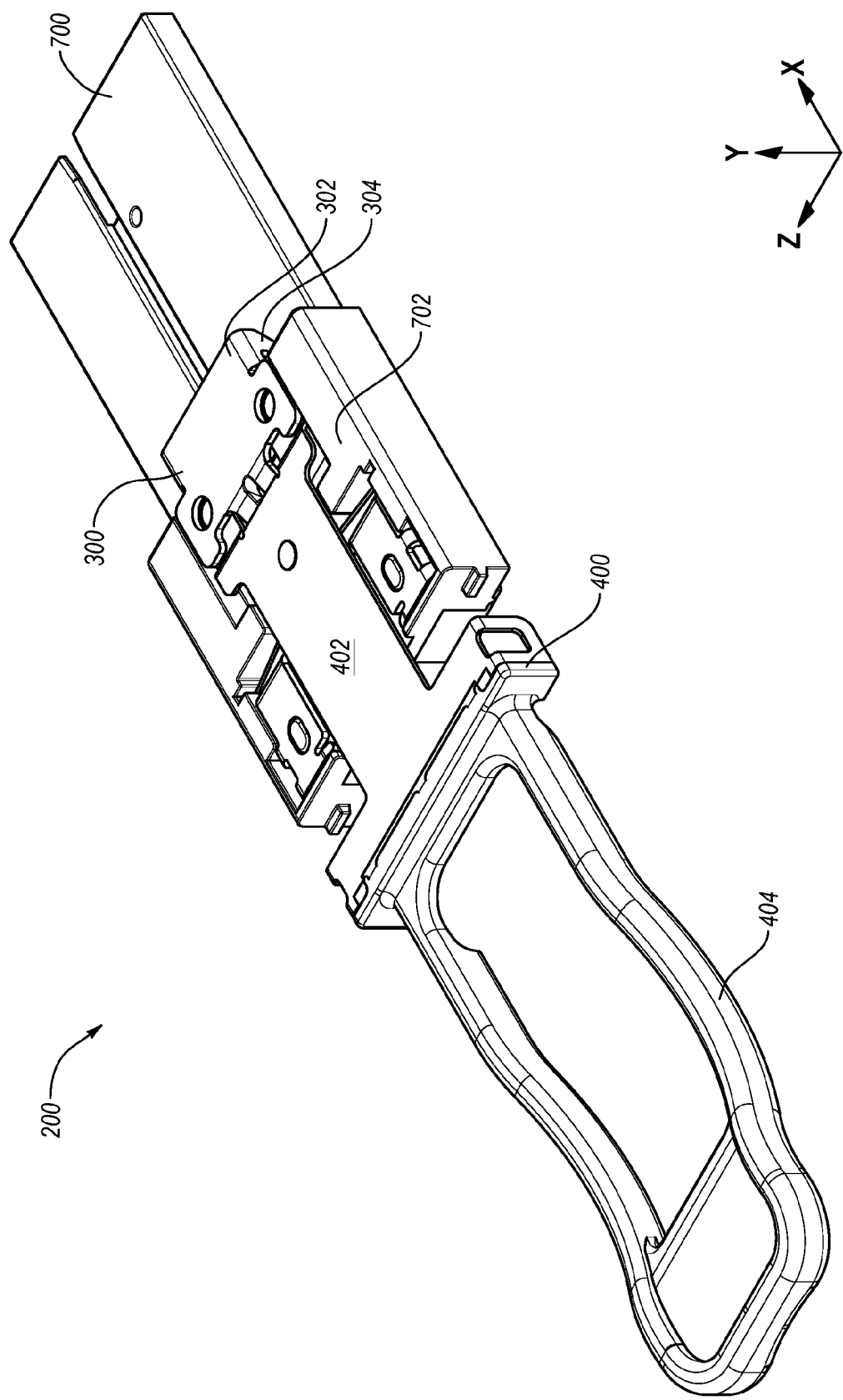
FIGS. 2A-2C illustrate an example latching mechanism that may be implemented in the communication module of FIGS. 1A and 1B.
Figure 2B:
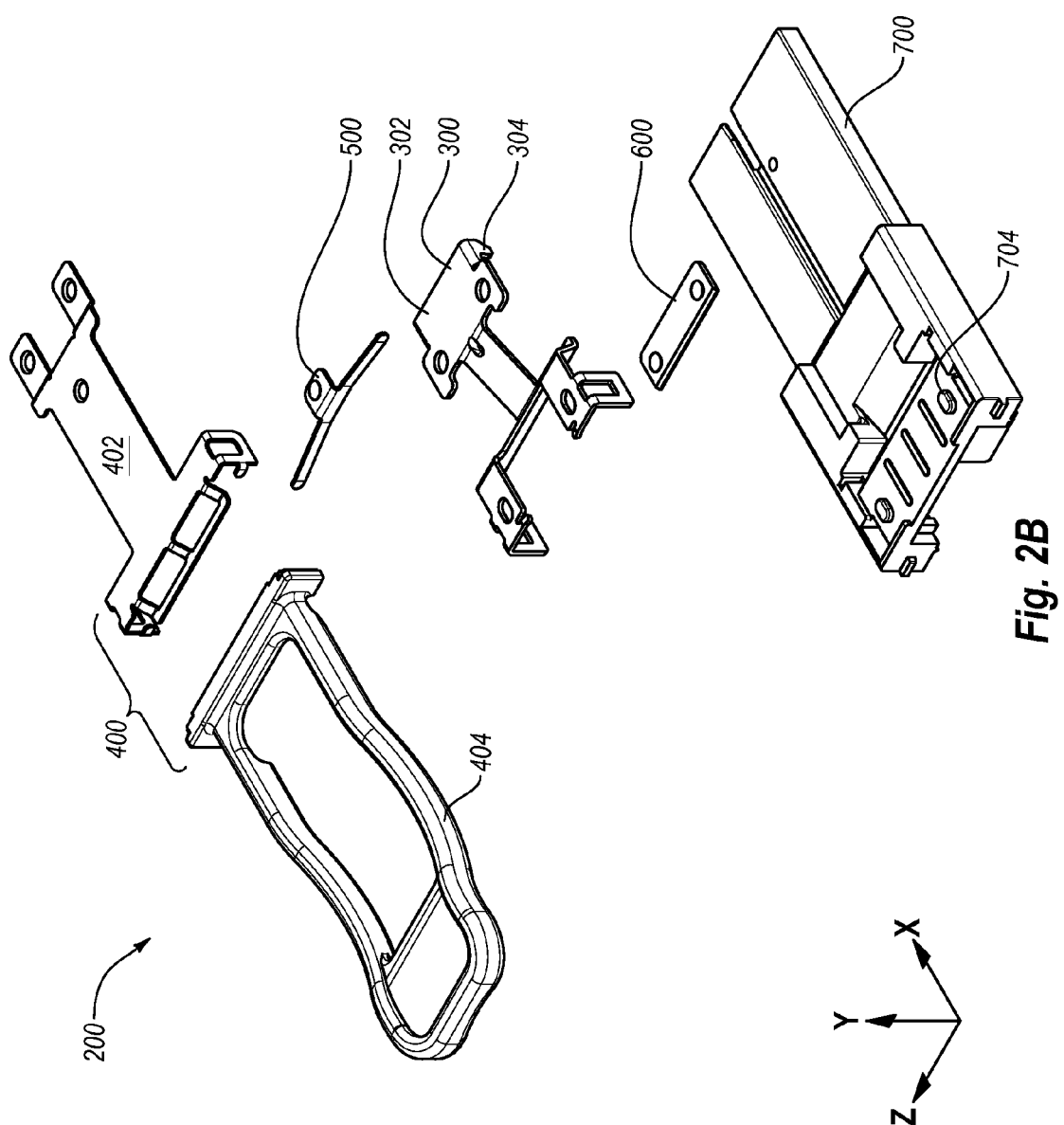
Figure 2C:
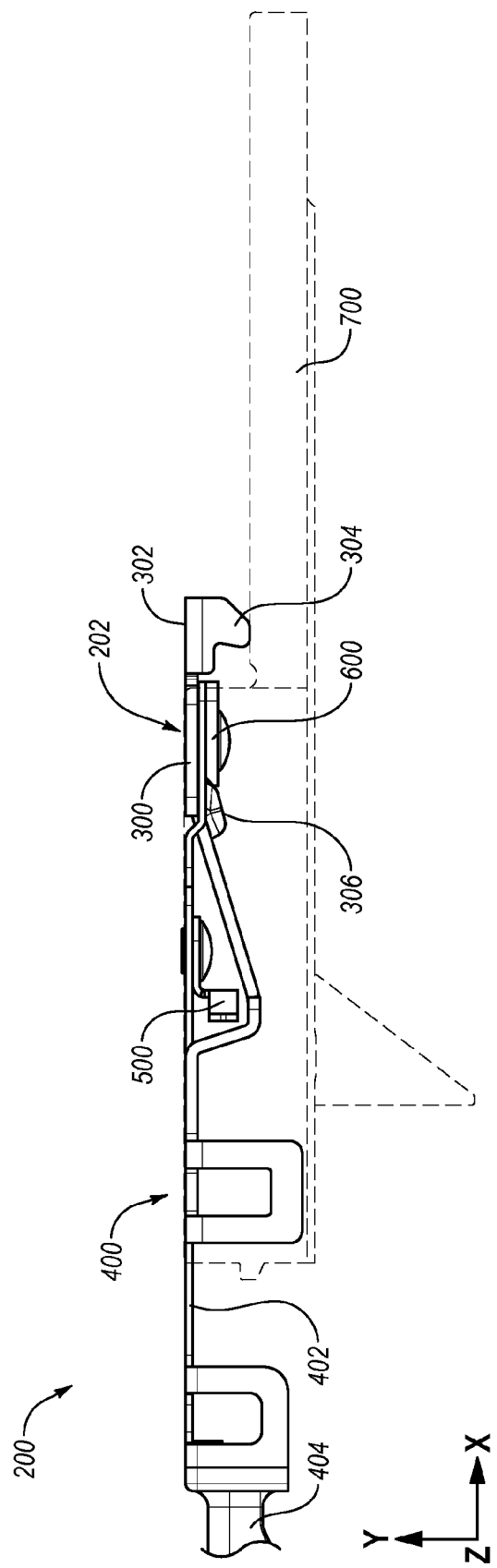

FIGS. 2A-2C illustrate some additional details of the latching mechanism 200 that may be implemented in the module 100 of FIGS. 1A and 1B according to some embodiments. Specifically, FIG. 2A is a perspective view of the latching mechanism 200. FIG. 2B is an exploded perspective view of the latching mechanism 200. FIG. 2C is a side view of a portion of the latching mechanism 200. A broad overview of the components of latching mechanism 200 will be provided with respect to FIGS. 2A-2C before explaining each of the components (i.e., 300, 400, 500, 600, and 700) in greater detail below with respect to FIGS. 3A-7.

Briefly, the latch 300 includes a first portion 302 configured to engage a structure of a receptacle of a host device. The latch 300 includes latch hooks 304 on the first portion 302 that are configured to engage corresponding cutouts, depressions, cavities, or other suitable structures formed in the receptacle of the host device. The latch 300, or at least the first portion 302 of the latch 300 including the latch hooks 304, may be configured to be displaced in a direction substantially normal to the top shell 700 to engage or disengage from the receptacle of the host device. In FIGS. 2A and 2B, the direction normal to the top shell 700 corresponds to the positive y-direction or the negative y-direction. The latch 300 may be displaced due to contact between a latch protrusion 306 (FIG. 2C only) and a cam 600.

In fact, the latch 300 may experience rotational displacement at least of the first portion 302 about an axis in or relatively nearer an end of the latch 300 opposite the first portion 302 during operation of the latching mechanism 200. For the relatively small rotations involved in disengaging from or engaging the receptacle of the host device, displacement components of the first portion 302 in the y-direction (positive or negative) may dominate displacement components of the first portion 302 in the x-direction (positive or negative), such that the displacement of the first portion 302 may be said to be substantially in the y-direction, or substantially normal to the top shell 700.

In some embodiments, the cam 600 is mechanically coupled to the latch release 400 but is not coupled to the latch 300. Specifically, the latch release 400 generally includes a latch release member 402 and a pull-tab 404. The latch release member 402 of the latch release 400 is configured to be mechanically coupled to the cam 600. The pull-tab 404 is configured such that an activation force may be applied to the pull-tab 404 by a user, which results in translation of the latch release 400 in the negative x direction with respect to the top shell 700. Thus, the latch release 400 is configured to translate independent of the top shell 700 and the latch 300 when an activation force is applied to the pull-tab 404, at least until the latch hooks 304 disengage from the host device.

The cam 600 may be positioned with respect to the latch 300 such that when the latch release 400 is translating, the cam 600 also translates and contacts the latch protrusion 306. As described in more detail below, the cam 600 has a sloped contact surface that contacts the latch protrusion 306. The activation force on the cam 600 in the negative x direction is translated by the sloped contact surface of the cam 600 to a displacement force in the positive y direction against the latch protrusion 306. When the activation force is sufficiently large, the displacement force displaces at least the first portion 302 of the latch 300 in the positive y direction. By displacing the first portion 302 in the positive y direction, the latch hooks 304 may disengage the latch 300 from the receptacle of the host device. On the other hand, in the absence of a sufficiently large actuation force, the latch 300 can engage the receptacle of the host device.

The return spring 500 (FIGS. 2B and 2C only) is positioned between the latch release 400 and the latch 300. The return spring 500 is mechanically coupled to the latch release 400. The return spring 500 is biased such that without an application of an activation force to the latch release 400, the cam 600 does not contact the latch protrusion 306. Additionally, following the application of an activation force to the latch release 400, the return spring 500 may, at least partially, return the cam 600 to a position in which the cam 600 does not contact the latch protrusion 306.

The top shell 700 (shown transparent in FIG. 2C as denoted by the dashed lines) generally provides a base in which at least portions of the latch release 400, the latch 300, the return spring 500, and the cam 600 are positioned. Additionally, the top shell 700 at least partially secures the latching mechanism 200 to a module, such as the module 100 of FIG. 1.

With specific reference to FIG. 2C, the latching mechanism 200 is depicted assembled without an activation force applied to the pull-tab 404. FIG. 2C illustrates relative positions of one or more components (e.g., 402, 404, 500, 306, 600, 304, 300, and 302). Specifically, the latching mechanism 200 includes the latch release member 402 positioned between the latch 300 and the cam 600 in an area denoted at 202 in which the latch release member 402 is coupled to the cam 600. Additionally, the latch 300 is positioned between the latch release member 402 and the top shell 700 in areas other than the area 202 where the latch release member 402 is coupled to the cam 600. The cam 600 is positioned between the latch release member 402 and the top shell 700. Additionally, a position of the return spring 500 is depicted between the latch 300 and the latch release member 402.

A. An Example Latch

Figure 3A:
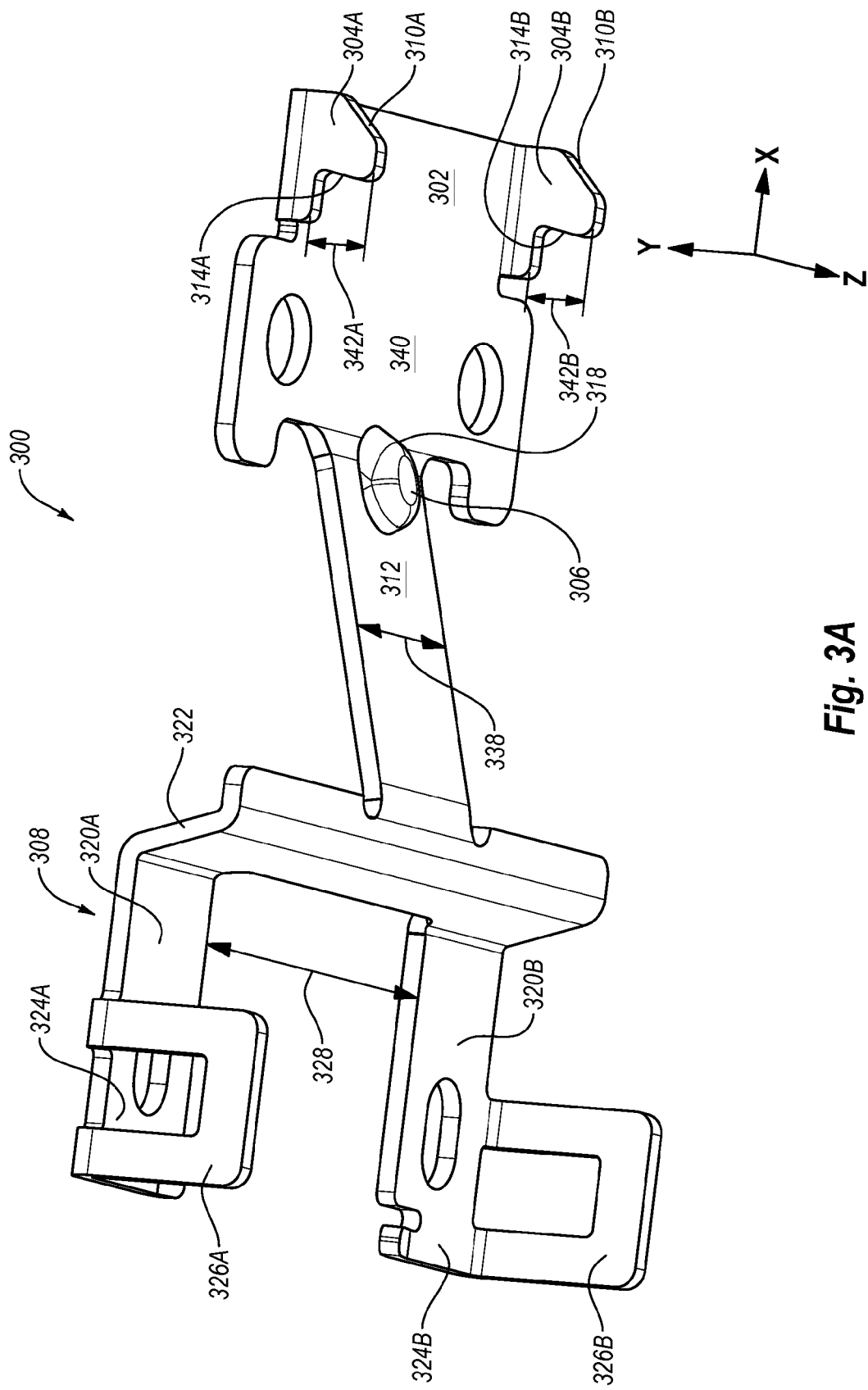
FIGS. 3A and 3B illustrate an example latch which may be implemented in the latching mechanism of FIGS. 2A-2C.
Figure 3B:
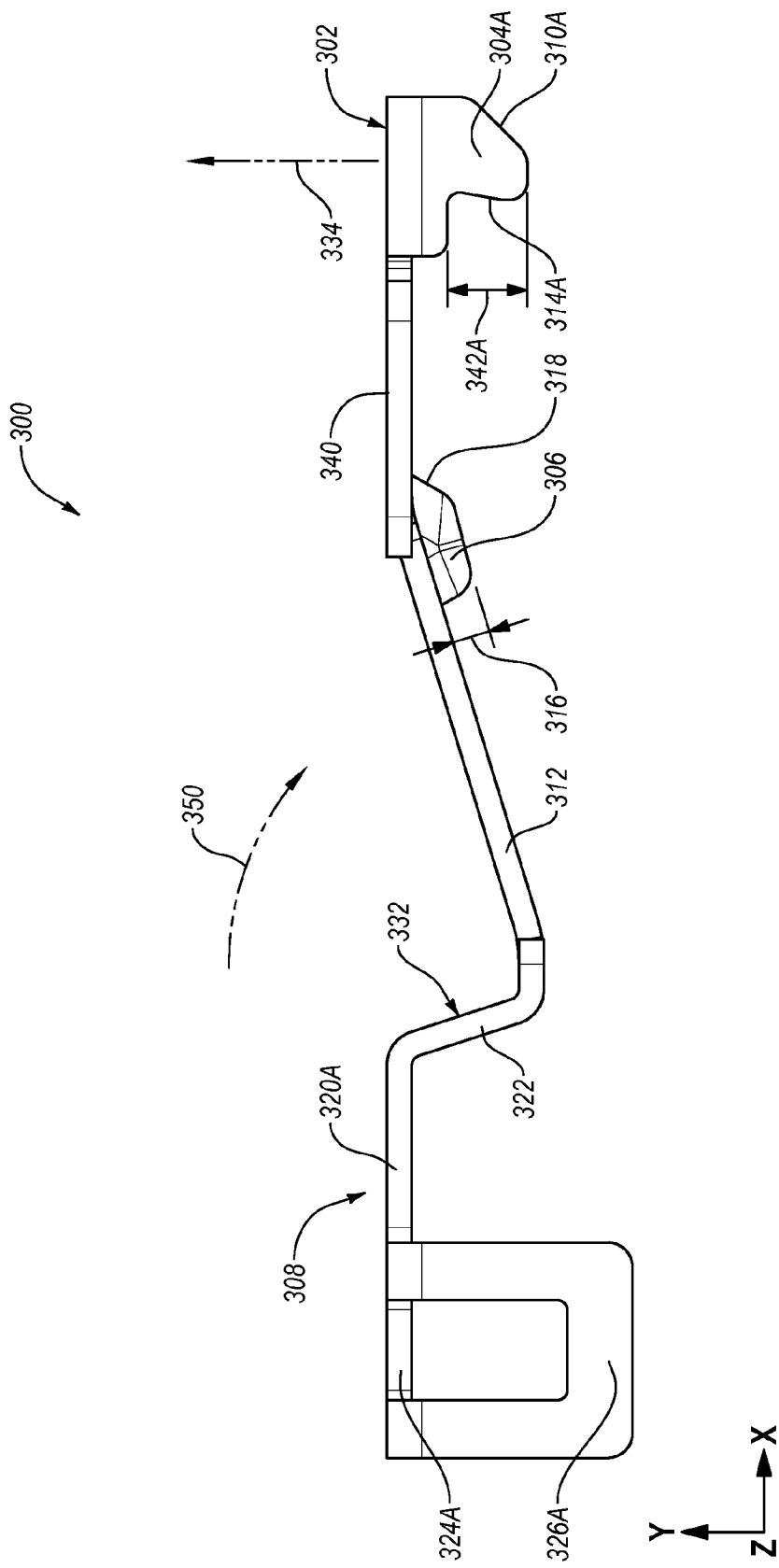

FIGS. 3A and 3B illustrate additional details of the latch 300, which may be implemented in the latching mechanism 200 of FIGS. 2A-2C. The latch 300 may be composed of sheet metal, plastic, other suitable material(s), or any combination thereof. In some embodiments, the latch 300 is configured to flex in the arbitrarily defined y-direction during operation. As such, in these and other embodiments, the latch 300 is at least partially resilient to enable elastic flex during operation.

As shown, the latch 300 includes the first portion 302 (introduced above), a second portion 340, and a third portion 308. The second portion 340 and the third portion 308 are connected by a latch neck 312. A width dimension 338 (FIG. 3A only) of the latch neck 312 is generally narrower in an arbitrarily defined z-direction than the first portion 302, the second portion 340, and the third portion 308. In this and other embodiments, the first portion 302, the second portion 340, the third portion 308, and the latch neck 312 are composed of a single material. However, this is not meant to be limiting. One or more of the first portion 302, the second portion 340, the third portion 308, or the latch neck 312 may be composed of a second material and affixed or otherwise bonded to the other(s) of the first portion 302, the second portion 340, the third portion 308, or the latch neck 312.

The first portion 302 includes one or more latch hooks 304A and 304B (generally, latch hook 304 or latch hooks 304). The latch hooks 304 are configured to engage a corresponding structure, such as a cutout, a cavity, a recess, or a depression of a receptacle of a host device (not shown). The latch hooks 304 thereby selectively secure a module, such as the module 100 of FIGS. 1A and 1B, within the receptacle of the host device.

As shown in FIGS. 3A and 3B, each of the latch hooks 304 includes a sloped leading edge 310A and 310B (generally, leading edge 310 or leading edges 310). Note, in FIG. 3B, only one of some features and components are visible. During insertion of the module 100 into a receptacle of a host device, the leading edges 310 may contact a leading edge of the receptacle and cause the latch 300 to flex and/or lift such that the first portion 302 of the latch 300 is displaced in the positive y-direction to clear the leading edge of the receptacle. The third portion 308 may remain substantially stationary, such that the latch neck 312 flexes to accommodate displacement (e.g., rotational movement) of the first portion 302 and the second portion 340. The second portion 340 and the first portion 302 may be displaced generally in the positive y-direction by rotation about the substantially stationary third end 308.

In some embodiments, the latch hooks 304 may each include a flat trailing edge 314A and 314B (generally, trailing edge 314 or trailing edges 314). Following displacement of the second portion 340 and the first portion 302 by the leading edge of the receptacle, the latch hooks 304 may slide along the receptacle before arriving at a cutout, cavity, recess, depression, or other corresponding feature of the receptacle having a leading edge. When the trailing edges 314 of the latch hooks 304 clear the leading edge of the cutout, cavity, recess, depression, or other corresponding feature of the receptacle, the second portion 340 and the first portion 302 may abruptly spring in the negative y-direction. The trailing edges 314, and more generally the latch hooks 304, may thereby engage the receptacle, preventing the latch 300 from translating in the negative x-direction with respect to the top shell 700.

While two latch hooks 304 are illustrated in FIG. 3A, the first portion 302 of the latch 300 may alternately include more or fewer than two latch hooks 304. Alternately or additionally, the locations of the latch hooks 304 and the structure configured to be engaged by the latch hooks 304 may be changed between the latch 300 and the receptacle of the host device. For example, the first portion 302 may include one or more cutouts, cavities, recesses, depressions, or other similar structures that are configured to engage corresponding hooks or protrusions on a receptacle of a host device. Thus, FIGS. 3A and 3B merely illustrate one example of a latch 300 configured to engage a structure of a receptacle of a host device and should not be construed to limit the embodiments disclosed herein.

The latch neck 312 of the latch 300 includes the latch protrusion 306. The latch protrusion 306 extends from the latch neck 312 in the negative y-direction. The latch protrusion 306 includes a protrusion height 316 (FIG. 3B only) and a sloped protrusion surface 318. The protrusion height 316 is a dimension defined in FIG. 3B as a shortest distance from a reference plane coplanar with a bottom surface of the latch neck 312 to a point on the latch protrusion 306 furthest from the reference plane.

The latch protrusion 306 may be attached to or integrally formed with the latch neck 312 such that an activation force may be transferred to the latch protrusion 306, which is transferred to the latch neck 312 and thus to the latch 300. Additionally, the sloped protrusion surface 318 may be oriented towards the first portion 302 of the latch 300. The p sloped protrusion surface 318 may therefore enable an activation force transferred to the latch protrusion 306 in the negative x-direction to result in motion of the second portion 340 and/or the first portion 302 in the positive y-direction.

The third portion 308 may include two securing features 320A and 320B (generally, securing features 320) and a ramped plane 322. Each of the securing features 320 generally includes a horizontal portion 324A and 324B and a vertical portion 326A and 326B. Note that the designation of the horizontal portions 324A and 324B as horizontal and vertical portions 326A and 326B as vertical is arbitrary. In FIGS. 3A and 3B, generally the horizontal portions 324A and 324B are oriented parallel to the xz plane and the vertical portions 326A and 326B are oriented parallel to the yx plane. The horizontal portions 324A and 324B and vertical portions 326A and 326B may secure the latch 300 to a top shell, such as top shell 700 described herein.

The securing features 320 are separated by an intra-securing feature dimension 328 (FIG. 3A only). The intra-securing feature dimension 328 refers to the distance in the z-direction between the securing features 320.

The ramped plane 322 is coupled to the securing features 320 and to the latch neck 312. The ramped plane 322 includes a ramped surface 332 (FIG. 3B only) that may contact a return spring, such as return spring 500 discussed herein. Additionally, the ramped plane 322 may at least partially transfer forces throughout the latch 300 when the second portion 340 and/or the first portion 302 are displaced.

For example, with combined reference to FIGS. 2B and 3B, the third portion 308 of the latch 300 may be positioned within a second cavity 704 of the top shell 700. The securing features 320 may secure the third portion 308 of the latch 300 to the top shell 700. The second portion 340, the first portion 302, and the latch neck 312 are not secured to the top shell 700 in the illustrated embodiments.

When the second portion 340 and the first portion 302 are displaced in the positive y-direction as indicated in FIG. 3B by arrow 334, because the third portion 308 is secured to the top shell 700, the third portion 308 is not displaced. The second portion 340 and the first portion 302 rotate and/or are displaced in the positive y-direction through flexure of the latch neck 312, thereby generating a return force. The return force is indicated by arrow 350 in FIG. 3B. The return force 350 urges the second portion 340 and the first portion 302 generally in the negative y-direction to return to the orientation illustrated in FIG. 3B when circumstances permit (e.g., absence of activation force and when the latch hooks 304 are properly seated in the host device or when the module is not inserted into a receptacle of a host device at all).

For example, with combined reference to FIGS. 3B and 2A, suppose the first portion 302 and the second portion 340 are displaced in a direction normal to the top shell 700, which may be represented by the arrow 334. The return force represented by the arrow 350 is imposed on the latch 300 due to the third portion 308 being secured to the top shell 700. The return force represented by the arrow 350 urges the first portion 302 and the second portion towards the top shell 700 when the first portion 302 and the second portion 340 have been displaced in the positive y-direction.

B. An Example Latch Release

Figure 4A:
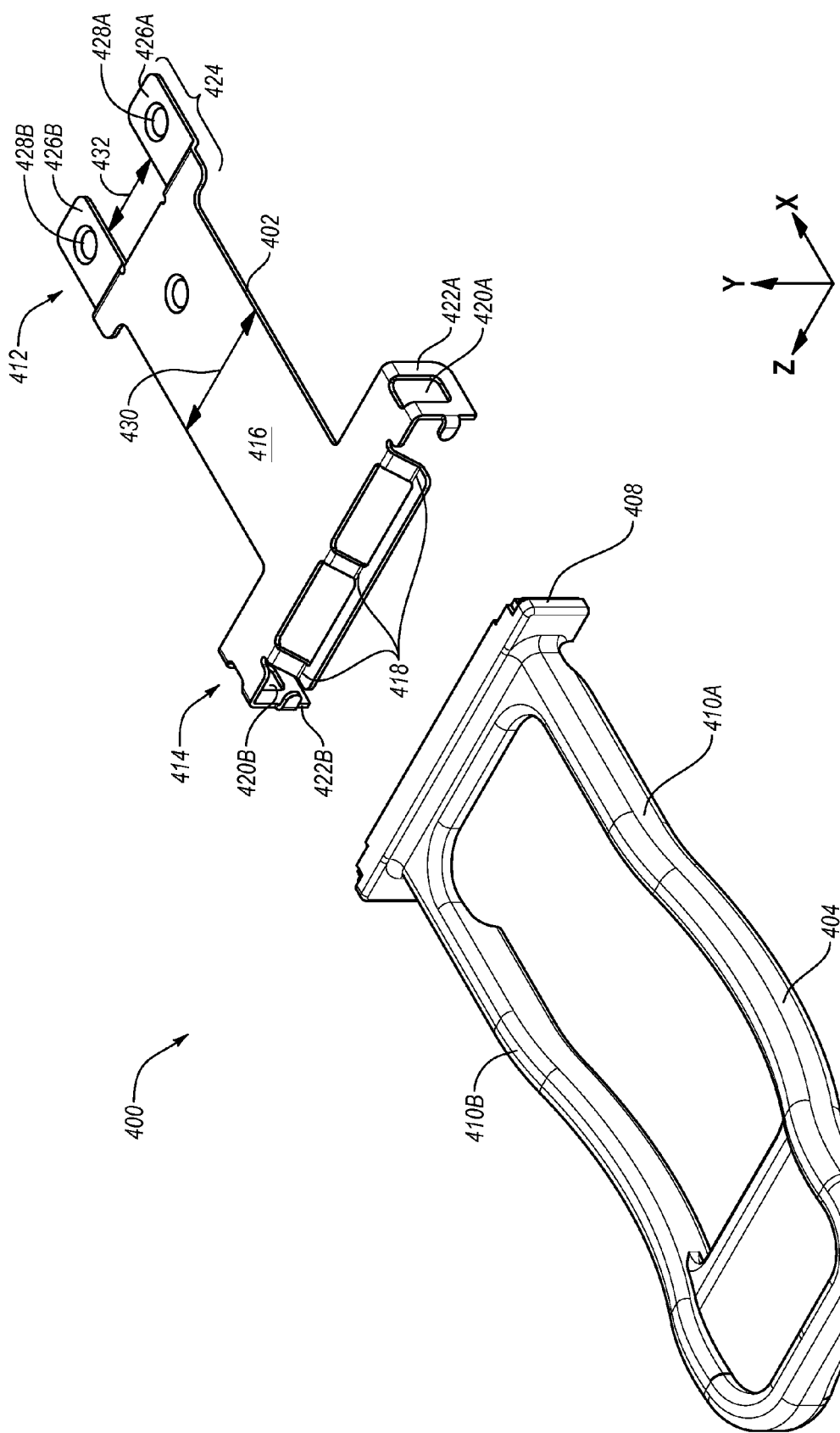
FIGS. 4A and 4B illustrate an example latch release that may be implemented in the latching mechanism of FIGS. 2A-2C.
Figure 4B:
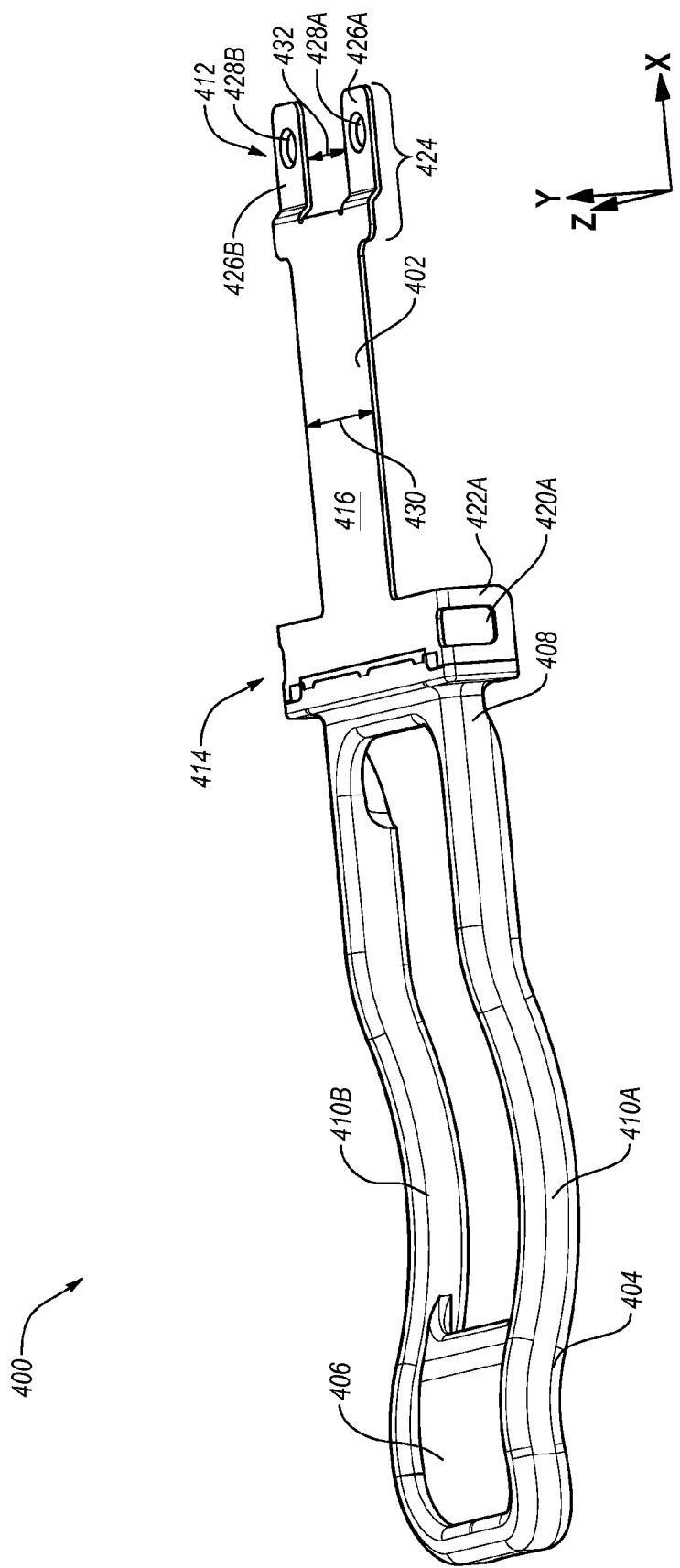

FIGS. 4A and 4B illustrate some additional details of the latch release 400 that may be implemented in the latching mechanism 200 of FIGS. 2A-2C. The latch release 400 includes a pull-tab 404 and a latch release member 402. The pull-tab 404 and the latch release member 402 are mechanically coupled such that activation forces applied to the pull-tab 404 may be transferred to the latch release member 402. For example, the pull-tab 404 may be overmolded onto the latch release member 402. Thus, an activation force applied to the pull-tab 404 may be transferred to the latch release member 402.

The pull-tab 404 may be composed of rubber, plastic, sheet metal, other suitable material(s), or any combination thereof. The pull-tab 404 includes a coupling end 408 at which the pull-tab 404 is mechanically coupled to the latch release member 402. Opposite the coupling end 408, the pull-tab 404 includes a handle 406. The handle 406 may be configured to be manipulated by a user. For example, the user may apply activation forces to the pull-tab 404 using the handle 406, which are transferred to the latch release member 402.

In this and other embodiments, the handle 406 may be connected to the coupling end 408 by tab arms 410A and 410B. The tab arms 410A and 410B may separate the handle 406 from the latch release member 402 to reduce heat transfer and/or to provide ergonomic advantages, for instance.

In some examples, the tab arms 410A and 410B may be omitted such that the handle 406 may be connected directly to the coupling end 408. Alternatively, one, three, or more tab arms 410A and 410B may be included in the pull-tab 404. Alternatively still, in some embodiments, the entire pull-tab 404 may be omitted and a user may apply activation forces directly to the latch release member 402.

The latch release member 402 may be composed of sheet metal, plastic, other suitable material(s), or any combination thereof. The latch release member 402 includes a first end 412 and a second end 414 connected by a latch release member neck 416 (member neck 416). In this and other embodiments, the first end 412, the second end 414, and the member neck 416 may be composed of a single material. However, this is not meant to be limiting. One or more of the first end 412, the second end 414, or the member neck 416 may be composed of a second material and affixed or otherwise bonded to the other(s) of the first end 412, the second end 414, or the member neck 416.

At the second end 414, the latch release member 402 includes one or more coupling structures 418 (FIG. 4A only) configured to mechanically couple the latch release member 402 to the pull-tab 404. For example, a portion of the pull-tab 404 may be over-molded on the coupling structures 418 in some embodiments. In some other embodiments, the pull tab 404 may be mechanically coupled to the coupling structures 418 using other techniques that include, but are not limited to, adhesives that secure the pull-tab 404 to the latch release member 402 or one or more features included in the pull tab 404 that interlock with the coupling structures 418.

Additionally, at the second end 414 the latch release member 402 includes limiting holes 420A and 420B (generally, limiting hole 420 or limiting holes 420; note only 420A is shown on FIG. 4B) defined in securing flaps 422A and 422B (generally, securing flap 422 or securing flaps 422). With combined reference to FIGS. 1A and 4B, the limiting holes 420 may correspond to the limiting protrusions 104 on the bottom shell 106. The limiting holes 420 may be sized to allow the latch release 400 to translate in the x-direction with respect to the other components of the module 100 at least a predefined distance. Additionally, the limiting protrusions 104 may be shaped such that the latch release 400 may be at least partially secured in the direction by the limiting protrusions 104.

For example, the limiting protrusions 104 may include sloped surfaces 132 configured to allow the latch release 400 to be pressed onto the bottom shell 106 by moving the latch release 400 in substantially the negative y-direction. The limiting protrusions 104 may contact and/or temporarily deform the securing flaps 422 as the securing flaps 422 proceed over the sloped surfaces 132. The limiting protrusions 104 enter the limiting holes 420 and the securing flaps 422 prevent the latch release 400 from becoming detached from the bottom shell 106.

Referring back to FIGS. 4A and 4B, at the first end 412, the latch release member 402 includes a cam-coupling portion 424. The cam coupling portion 424 includes two coupling flaps 426A and 426B (generally, coupling flap 426 or coupling flaps 426) defining coupling holes 428A and 428B (generally, coupling holes 428). The cam-coupling portion 424 generally includes a ramped section such that the coupling flaps 426 are in a separate but parallel plane to the member neck 416. In this and other embodiments, a plane including the coupling flaps 426 includes a lower y-coordinate than a plane including the member neck 416. The distance between the plane including the member neck 416 and the plane including the coupling flaps 426 may be related to dimensions of a latch, such as the latch 300 described herein.

With combined reference to FIGS. 2A, 3A, 4A, and 4B, the latch release member 402 may be sized to correspond to the latch 300. For example, a member neck width 430 may be sized to substantially correspond to the intra-securing feature dimension 328, meaning the member neck width 430 may be less than or about equal to the intra-securing feature dimension 328. Additionally, an intra-coupling flap dimension 432 may be sized to correspond to the width dimension 338 of the latch neck 312, meaning the intra-coupling flap dimension 432 may be greater than or about equal to the width dimension 338 of the latch neck 312.

Sizing the member neck width 430 to correspond to the intra-securing feature dimension 328 and sizing the intra-coupling flap dimension 432 to correspond to the width dimension 338 of the latch neck 312 may enable a specific positioning of the latch release member 402 with respect to the latch 300. For example, in some embodiments, the latch release member 402 is positioned between (e.g., in the z direction) the securing features 320 at the third end 308 of the latch 300; the ramped plane 322 and the latch neck 312 are positioned between the latch release member 402 and the top shell 700 (e.g., in the y direction), and the coupling flaps 426 are positioned between the second portion 340 of the latch 300 and the top shell 700 (e.g., in the y direction).

C. An Example Return Spring

Figure 5:
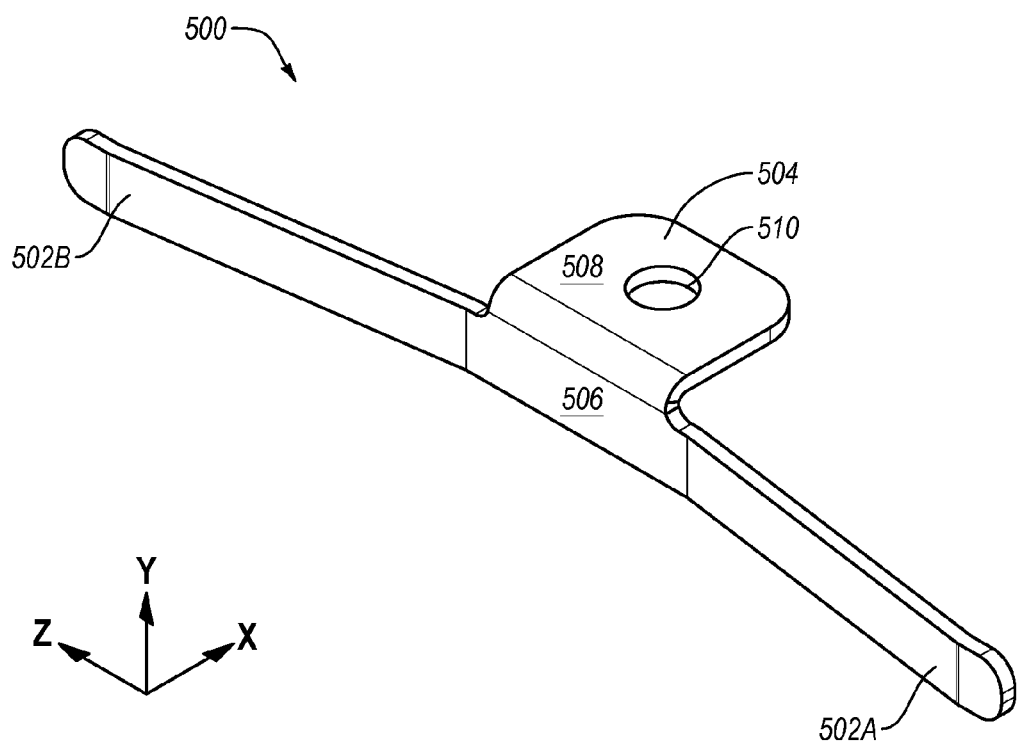
FIG. 5 illustrates an example return spring that may be implemented in the latching mechanism of FIGS. 2A-2C.

FIG. 5 illustrates some additional details of the return spring 500 that may be implemented in the latching mechanism 200 of FIGS. 2A-2C. The return spring 500 may be composed of sheet metal, plastic, other suitable material(s), or any combination thereof. Generally, the return spring 500 may be mechanically attached to the latch release 400 discussed herein. The return spring 500 may bias the latch release 400 and reposition the latch release 400 following an application of an activation force to the latch release 400.

The return spring 500 includes two spring arms 502A and 502B (generally, spring arm 502 or spring arms 502) and a center portion 504 between the spring arms 502. The center portion 504 includes a vertical portion 506 and a horizontal portion 508. The designation of the vertical portion 506 as vertical and the horizontal portion 508 as horizontal is arbitrarily defined in that the vertical portion 506 may be horizontal depending on the orientation of the return spring 500. As depicted in FIG. 5, the vertical portion 506 is substantially parallel to the yz-plane and the horizontal portion 508 is substantially parallel to the xz-plane.

The horizontal portion 508 defines a connection hole 510. The connection hole 510 may receive a mechanical coupling or fastener that secures the return spring 500 with respect to the latch release 400 described herein. Alternatively, in some embodiments, the horizontal portion 508 may include another feature to couple or mechanically connect the return spring 500 to the latch release 400.

The vertical portion 506 is positioned between and coupled to the spring arms 502. A first spring arm 502A extends from the vertical portion 506 at an angle generally in the negative z-direction and in the negative x-direction. Additionally, a second spring arm 502B extends from the vertical portion 506 at an angle generally in the positive z-direction and in the negative x-direction. The spring arms 502 may be configured to contact the ramped surface 332 of the latch 300 of FIGS. 3A and 3B.

FIGS. 8A and 8B illustrate an example operation of the return spring 500 of FIG. 5. FIGS. 8A and 8B include the return spring 500, the latch 300, and the latch release 400. The view of FIGS. 8A and 8B is a bottom view of these components, e.g., looking from the negative y-side of these components in the positive y-direction. The return spring 500 is shown using dashed lines in FIGS. 8A and 8B because the return spring 500 is between the latch 300 and the latch release 400. Additionally, in FIGS. 8A and 8B, a cage assembly 808 of a host device is depicted. The cage assembly 808 is shown engaged by the latch 300.

With combined reference to FIGS. 5 and 8A, without an activation force applied to the latch release 400, the latch release 400 is in an initial position indicated by dashed line 802. In the initial position, the spring arms 502 contact the ramped surface 332 of the latch 300. The return spring 500 may apply a biasing force to the latch release 400. The biasing force generally acts to bias the latch release 400 in the initial position.

With combined reference to FIGS. 5 and 8B, an activation force may be applied to the latch release 400 in the negative x-direction represented in FIG. 8B by arrow 810. When the activation force represented by the arrow 810 is greater than the biasing force, the latch release 400 may translate in the negative x-direction with respect to the latch 300 to a final position indicated by dashed line 804. The dashed line 804 is offset from the dashed line 802 by a distance 806.

In the second position, the spring arms 502 are compressed against the ramped surface 332 of the latch 300 creating a return force against the latch 300. Specifically, the spring arms 502 may be flexed against the ramped surface 332, thereby creating the return force. When the activation force represented by arrow 810 applied to the latch release 400 is decreased below the return force, the spring arms 502 act to return the latch release 400 to the initial position indicated by dashed line 802.

D. An Example Cam

Figure 6:
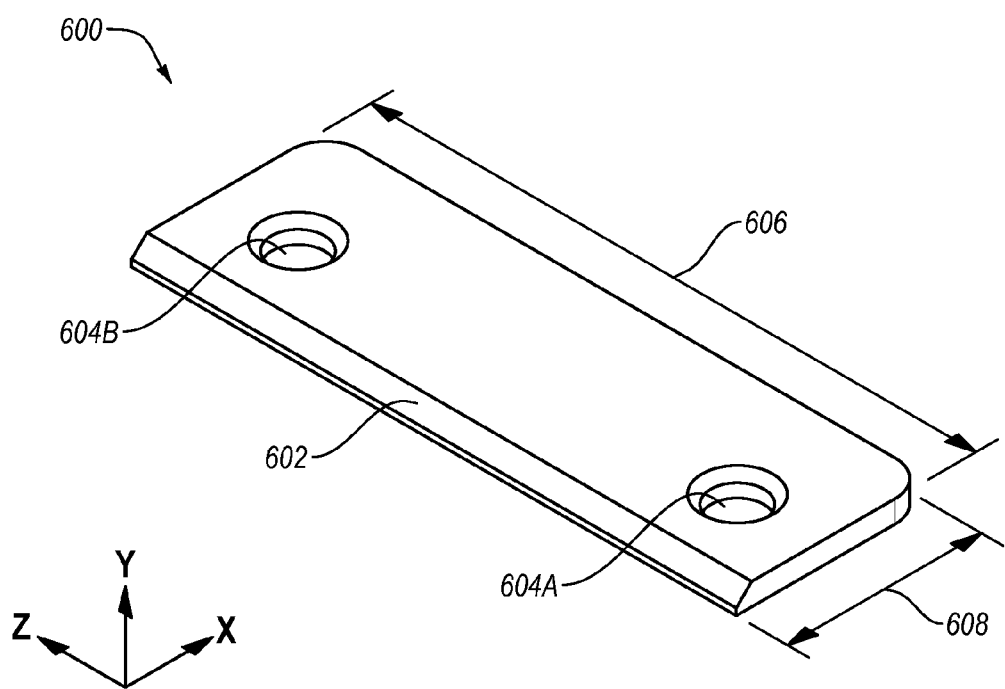
FIG. 6 illustrates an example cam that may be implemented in the latching mechanism of FIGS. 2A-2C.

FIG. 6 illustrates some additional details of the cam 600 that may be implemented in the latching mechanism 200 of FIGS. 2A-2C. Generally, the cam 600 is coupled to the latch release 400 described herein, and configured to translate when an activation force is applied to the latch release 400 to displace the latch 300 described herein. The cam 600 generally includes a rounded-rectangular block having a cam length 606 and a cam depth 608. The cam length 606 and/or the cam depth 608 may be sized to correspond to a top shell, such as the top shell 700 discussed herein. For example, with combined reference to FIGS. 6 and 7, the cam length 606 may be sized such that the cam 600 may be positioned in a first cavity 706. Additionally or alternatively, the cam depth 608 may be sized such that the cam 600 may be positioned in the first cavity 706. Additionally, the cam length 606 and/or the cam depth 608 may be sized to enable the cam 600 to translate and thus displace a latch at least partially positioned in the first cavity 706, such as the latch 300 described herein.

With combined reference to FIGS. 2C, 4A, 4B, and 6, the cam 600 may also include two cam connection holes 604A and 604B. The cam connection holes 604A and 604B may substantially align with the coupling holes 428 defined in the coupling flaps 426 of the latch release 400. A fastener (not shown) may be inserted in the cam connection holes 604A and 604B and the coupling holes 428 to attach and/or mechanically couple the latch release 400 to the cam 600. Alternatively, the cam 600 may be mechanically coupled to the latch release member 402 by solder, adhesive, or other suitable fastener(s).

In some embodiments, when the cam 600 is mechanically coupled to the coupling flaps 426, the cam 600 may be positioned between the coupling flaps 426 and the top shell 700 such that an activation force applied to the latch release 400 translates the cam 600 relative to the top shell 700, thereby contacting and displacing the first portion 302 of the latch 300.

Referring to FIGS. 3A, 3B, and 6, the cam 600 may also include a contact surface 602. The contact surface 602 may be configured to contact the sloped protrusion surface 318 of the latch protrusion 306 when the cam 600 is translated. Specifically, the contact surface 602 may be configured to displace the latch 300 through contact with the sloped protrusion surface 318 about the heights 342A and 342B of the trailing edges 314 of the latch hooks 304. Thus, the latch hooks 304 may disengage from a receptacle of a host device (not shown) when displaced sufficiently.

E. An Example Top Shell

Figure 7:
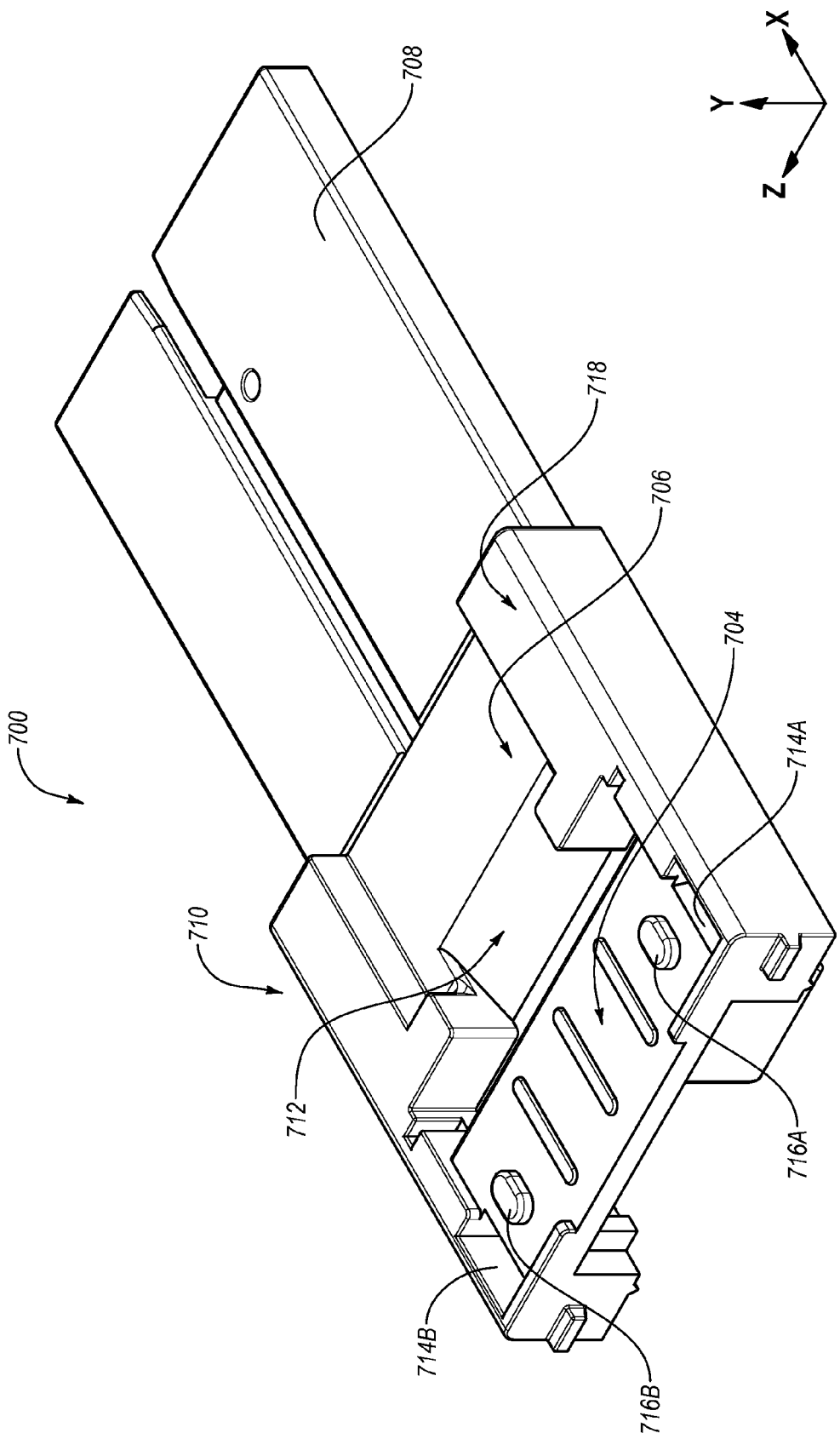
FIG. 7 illustrates an example top shell that may be implemented in the latching mechanism of FIGS. 2A-2C.

FIG. 7 illustrates some additional details of the top shell 700 that may be implemented in the latching mechanism 200 of FIGS. 2A-2C. Generally, the top shell 700 includes an inserted portion 708 that may be inserted into a receptacle of a host device (not shown). Additionally, the top shell 700 may include an external portion 710 that remains external to the receptacle when the inserted portion 708 is inserted into the receptacle. The external portion 710 defines the second cavity 704, a sloped cavity 712, the first cavity 706, and two securing feature slots 714A and 714B.

With combined reference to FIGS. 3A, 3B, and 7, the third portion 308 of the latch 300 is configured to be positioned in the second cavity 704. Accordingly, the dimensions of the third portion 308 may correspond and/or be similar to the dimensions of the second cavity 704. Additionally, the third portion 308 may be secured in the second cavity 704 by inserting the vertical portions 326A and 326B of the securing features 320 into the securing feature slots 714A and 714B. Additionally or alternatively, the third portion 308 may be secured in the second cavity 704 by one or more cavity protrusions 716A and 716B.

The latch neck 312 is configured to be positioned in the sloped cavity 712. The sloped cavity 712 may generally include a shape that confines the latch neck 312 laterally (i.e., in the z-direction) by the external portion 710. In some embodiments, when positioned in the sloped cavity 712, the latch neck 312 may be substantially below a top surface 718 of the external portion 710.

The second portion 340 may be configured to be positioned in the first cavity 706. The second portion 340 may be substantially confined laterally (i.e., in the z-direction) by the external portion 710 of the top shell 700. However, the second portion 340 may be free to be displaced generally in the y-direction.

The first portion 302, including the latch hooks 304, generally extend past the external portion 710 and hang over the inserted portion 708. With this configuration, when inserted portion 708 is inserted into the receptacle, the latch hooks 304 engage the receptacle, while allowing the external portion 710 to be positioned external to the receptacle.

III. Example Operation of a Latching Mechanism

FIGS. 9A and 9B illustrate an example operation of the latching mechanism 200 of FIGS. 2A-2C. Specifically, FIGS. 9A and 9B illustrate sectional views of the latching mechanism 200 in operation with respect to a cavity 902 defined in a cage assembly 904 or other receptacle of a host device. FIG. 9A illustrates the latch 300 engaged in the cavity 902. FIG. 9B illustrates the latch 300 disengaged from the cavity 902.

Referring to FIGS. 9A and 9B, a portion of the latch release 400, a portion of the latch 300, and the cam 600 are depicted positioned in the first cavity 706 of the top shell 700. In FIG. 9A, the latch hook 304 is shown engaged in the cavity 902. Additionally, the latch release 400 and the cam 600 are in a latched position represented in FIG. 9A by a dashed line 906. In the latched position, the cam 600 is not in contact with and/or displacing the latch protrusion 306.

Referring to FIG. 9B, when an activation force in the negative x-direction is applied to the latch release 400, the latch release 400 translates in the negative x-direction. In FIG. 9B, the activation force in the negative x-direction is represented by arrow 910. The latch release 400 is mechanically coupled to the cam 600; accordingly, the cam 600 also translates relative to the top shell 700 in the negative x-direction. When the cam 600 and the latch release 400 translate in the negative x-direction, the sloped contact surface 602 of the cam 600 contacts the sloped protrusion surface 318 of the latch protrusion 306. As the latch release 400 and the cam 600 further translate in the negative x-direction, the sloped contact surface 602 of the cam 600 displaces the latch 300 in the positive y-direction. When the latch release 400 and the cam 600 translate to an unlatched position, represented by dashed line 908, the latch hooks 304 are disengaged from the cavity 902.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A latching mechanism configured to selectively secure a communication module to a receptacle of a host device, the latching mechanism comprising:
    a latch including a latch hook and latch protrusion;
    a latch release; and
    a cam mechanically coupled to latch release, the cam positioned with respect to the latch such that an activation force applied to the latch release translates the cam to contact the latch protrusion and displace the latch hook,
    wherein the latch comprises a first portion including the latch hook, a second portion integral with the first portion, and a latch neck connecting a third portion to the second portion, the second portion and the first portion configured to be displaced substantially in a first direction;
    wherein when the second portion and the first portion are displaced, a return force is generated that urges the second portion and the first portion in a second, opposite direction;
    wherein the third portion includes two securing features separated by an intra-securing feature dimension, the securing features configured to secure the latch to a shell of a module; and
    wherein the latch release comprises a latch release member having a member neck width corresponding to the intra-securing feature dimension, the latch release configured to be positioned between the securing features, and two coupling flaps separated by an inter-coupling flap dimension corresponding to a width dimension of the latch neck, wherein the coupling flaps are configured to be mechanically coupled to the cam and the latch neck is sized to be positioned between the coupling flaps.

2. The latching of mechanism of claim 1, wherein latch release comprises a latch release member and a pull-tab, the pull-tab is overmolded onto the latch release member, and the activation force is applied to the pull-tab.

3. The latching mechanism of claim 1, further comprising a top shell defining a plurality of cavities in which the latch, the cam, and the latch release are configured to be positioned.

4. The latching of mechanism of claim 1, further comprising a return spring positioned between the latch and the latch release, the return spring imposing a biasing force to bias the cam in a position in which the cam is not contacting the latch protrusion.

5. The latching mechanism of claim 1, wherein the latch includes a ramped surface configured to contact the return spring when the activation force is applied to the latch release generating a return force that acts to return the cam to the position in which the cam is not contacting the latch protrusion.

6. A communication module comprising:
    a shell defining a cavity within which at least one transmitter and at least one receiver are positioned for transmitting and receiving data signals, the shell including a top shell defining a first cavity and a second cavity; and
    a latching mechanism secured to the shell and at least partially positioned within the first cavity and the second cavity, the latching mechanism configured to selectively secure the communication module within a receptacle of a host device, the latching mechanism including:
a latch including:
   a first portion including a latch hook, the latch hook positioned outside of the first cavity,
   a second portion positioned in the first cavity,
   a third portion secured in the second cavity, and
   a latch neck connecting the third portion to the second portion, the second portion and the first portion free to be displaced in a direction substantially normal to a top surface of the shell;
a latch release configured to translate independent of the latch and the top shell when an activation force is applied to the latch release, the latch release including:
   a latch release member neck, the latch neck positioned between the latch release member neck and the top shell, and
   a coupling flap positioned between the second portion and a cam; and
the cam mechanically coupled to the coupling flap, the cam positioned between the coupling flap and the top shell such that the activation force applied to the latch release translates the cam to contact and displace the first portion.

7. The communication module of claim 6 wherein the latch comprises a latch protrusion extending from the latch neck towards the top shell, the latch protrusion configured to contact the cam and transfer the activation force applied to the latch release to displacement of the first portion in the direction substantially normal to the top surface of the shell.

8. The communication module of claim 7, wherein the latch protrusion comprises a sloped protrusion surface and a protrusion height, and wherein the cam includes a contact surface configured to contact the sloped protrusion surface, the cam and the protrusion height configured to displace the first portion about a height of the latch hook.

9. The communication module of claim 7, further comprising a return spring positioned between the latch release and the latch, the return spring mechanically coupled to the latch release to bias the latch release in an initial position in which the cam does not contact the latch protrusion.

10. The communication module of claim 9, wherein when the activation force is applied to the latch release, a return force is created in the return spring configured to return the latch release to the initial position.

11. The communication module of claim 6, wherein when the first portion is displaced in the direction substantially normal to the top surface of the shell, a return force is generated that acts to displace the first portion in a second direction towards the top surface of the shell.

12. The communication module of claim 6, wherein the shell further comprises a bottom shell including a limiting protrusion corresponding to a limiting hole defined in the latch release, the limiting holes sized to allow the latch release to translate parallel to the shell at least a predefined distance.

13. The communication module of claim 12, wherein the limiting protrusions are shaped to at least partially secure the latching mechanism to the shell.

14. The communication module of claim 6, wherein the communication module is substantially compliant with the CXP form factor.

15. A latching mechanism configured to selectively secure a communication module to a receptacle of a host device, the latching mechanism comprising:
   a latch including a latch hook, a latch protrusion, and a ramped surface;
   a cam mechanically coupled to a latch release;
   a return spring positioned between the latch and the latch release and configured to contact the ramped surface;
   a top shell of the communication module defining a plurality of cavities in which the cam, the latch release, the latch, and the return spring are configured to be at least partially positioned; and
   the latching mechanism configured such that when an activation force is applied to the latch release, the latch release and the cam translate independent of the latch and the top shell such that the cam contacts the latch protrusion, displacing the latch hook and the return spring is compressed against the ramped surface generating a return force.

16. The latching mechanism of claim 15, wherein the latch release is secured to a bottom shell of the communication module by limiting protrusions, the limiting protrusions configured to secure the latch release to the communication module and enable translation of the latch release with respect to the communication module.

* * * * *